July 24, 1962  F. M. CUMMINGS ETAL  3,046,480
CIRCUIT TESTER
Filed May 1, 1959
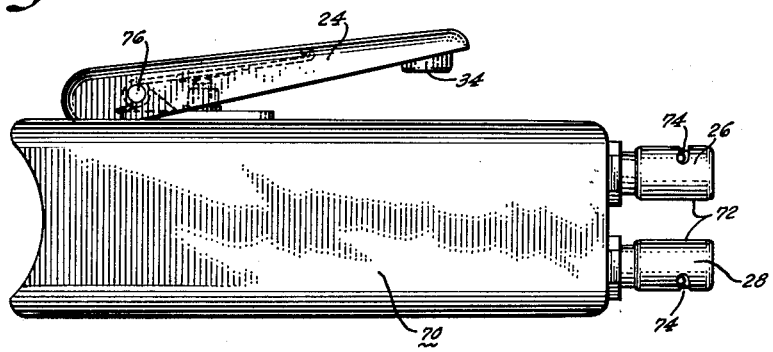
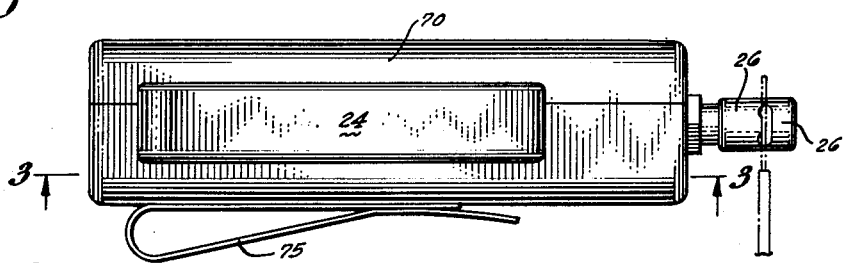
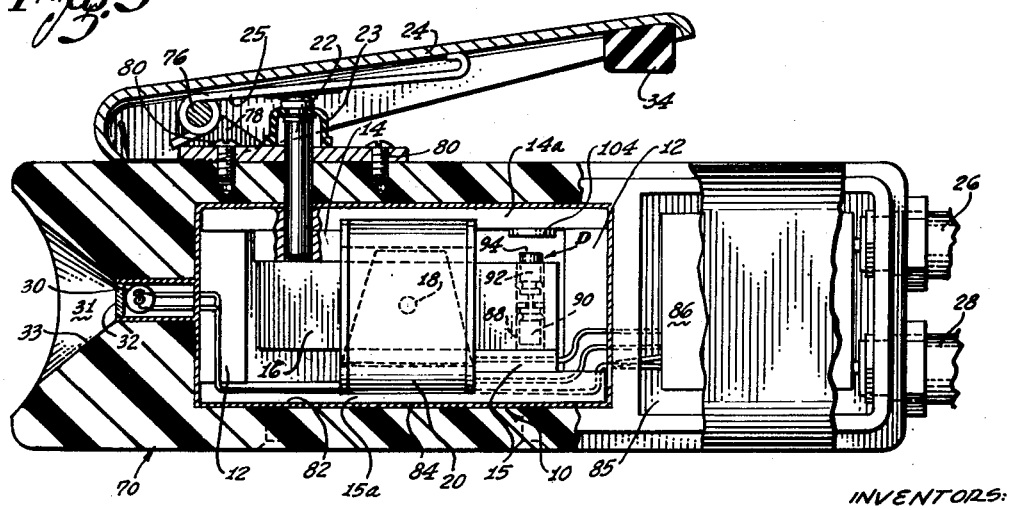
INVENTORS:
Francis M. Cummings
Walter H. Fleming
Victor H. Matson
By Smyth & Roston
Attorneys July 24, 1962 F. M. CUMMINGS ETAL 3,046,480
CIRCUIT TESTER
Filed May 1, 1959 3 Sheets-Sheet 2
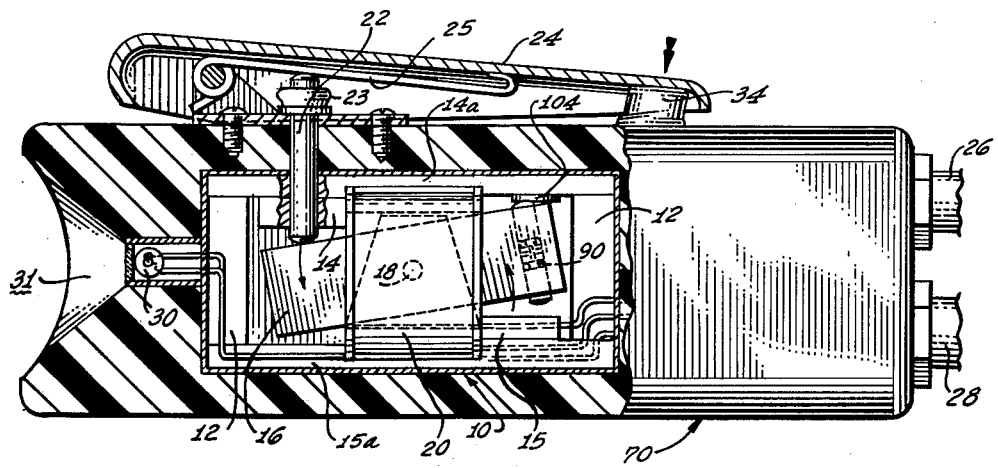
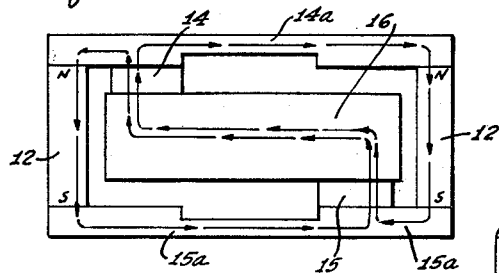
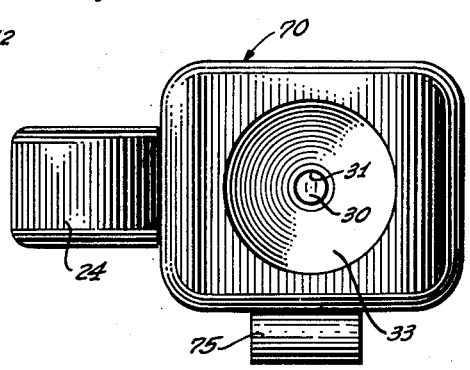
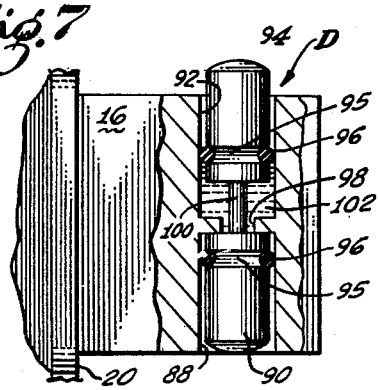
INVENTORS:
Francis M. Cummings
Walter H. Fleming
Victor H. Matson
Attorneys

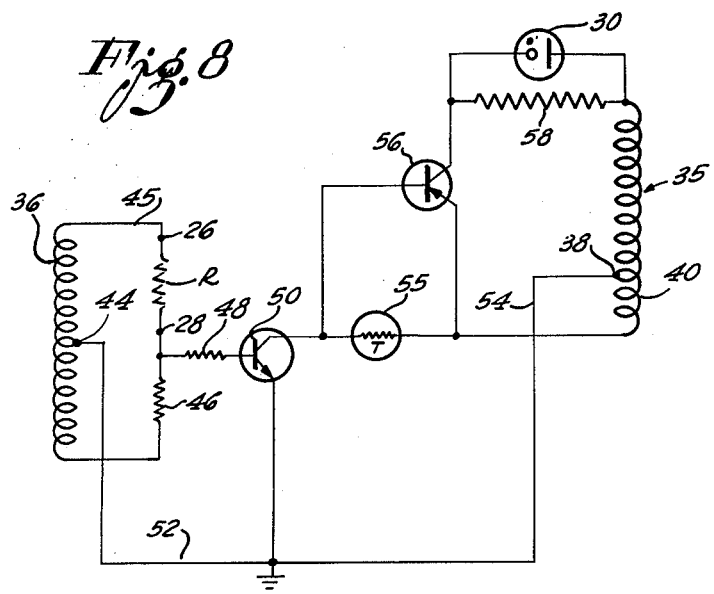
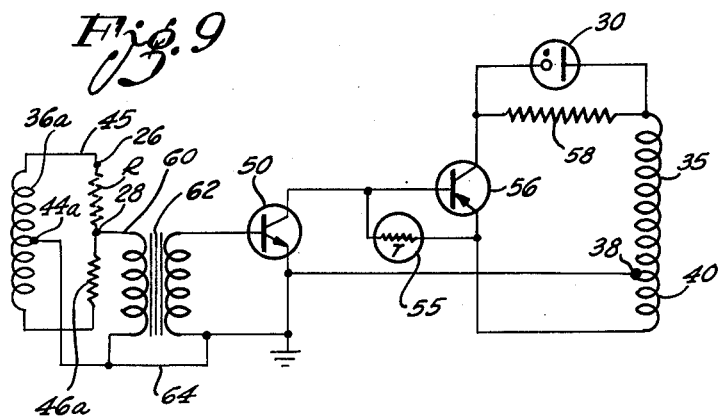

United States Patent Office 3,046,480
Patented July 24, 1962

3,046,480
CIRCUIT TESTER
Francis M. Cummings, Manhattan Beach, and Walter H. Fleming and Victor H. Matson, Los Angeles, Calif., assignors, by mesne assignments, to The Electrada Corporation, Culver City, Calif., a corporation of Delaware
Filed May 1, 1959, Ser. No. 810,293
15 Claims. (Cl. 324—62)

This invention relates to a device for prechecking the operativeness of a circuit without energizing the circuit above a predetermined minimum level. Thus the invention may be used to test a circuit without triggering a sensitive device in the circuit.

The invention is widely applicable for its basic purpose. It may be used, for example, to test flash bulbs without igniting the flash bulbs. As another example, it may be used for testing the fuses of bombs without detonating the bombs. The invention has been initially embodied, however, as a military device for testing demolition circuits without activating the detonators in the circuits. This initial embodiment of the invention is described herein by way of example and will afford adequate guidance for those skilled in the art who may have occasion to apply the invention to other specific purposes.

A demolition circuit may be tested by applying a voltage source that is suitably controlled to avoid an energy level high enough to activate the detonators in the circuit and by measuring the resultant current flow. If the circuit is inoperative, little or no current will flow but if the circuit is complete, sufficient current will flow to indicate its completeness.

The invention is particularly directed to a tester to meet the requirements for military usage and especially the requirements for usage under war conditions in enemy territory. One of these requirements is compactness and lightness of weight for portability. The testing device should be small enough and light enough to hold in one hand and to be carried in a user's pocket. Another requirement is that the device be rugged to withstand the rough usage and heavy impacts that may be expected in military activities. Still another requirement is that the device be fool-proof and safe to prevent the application of a test current sufficient to activate the detonators in a demolition circuit. A further requirement is that the device operate silently and emit no light in darkness. A still further requirement is that the device maintain its effectiveness indefinitely with no loss in ability to apply the required test voltage.

It is old to test the continuity of such a circuit with a steady flow of direct current using a sensitive battery-powered galvanometer. To make sure that the explosive charges are not detonated, the current amperage must be exceedingly low and the test instrument must be accordingly exceedingly sensitive.

This prior art procedure does not meet the above requirements for military usage. One disadvantage is that the batteries that are employed are vulnerable to damage and inevitably deteriorate with the passage of time. Another disadvantage is that an instrument of the required high degree of sensitivity is not a rugged and durable instrument. A third disadvantage is that the necessarily exceedingly small amperage test current provides too little power to energize a signal device that is effective for unmistakable positive indication of the continuity of the circuit under test.

The present invention is based on the concept of the effective separation of the sensing current which flows through the circuit under test and the indicating current which is used to activate the indicating means. In accordance with the present invention, sensing energy at a relatively low level is introduced to the circuit to be tested, and this energy is held below a particular threshold value so that the circuit under test will not be actuated by that energy. Appropriate circuitry is provided which responds to the low level sensing energy to provide indicating energy at a relatively high level, and the indicating energy is used to activate the indicating device. This enables a lamp to be used as the indicating device, for example, and it allows the lamp to be illuminated at a relatively high brightness level by the indicating energy, which indicating energy is produced in response to a low level current continuity from the flow of sensing energy through the circuit under test.

The present invention is also based on the concept that the avoidance of sufficient circuit energy to detonate the explosives, or otherwise activate the circuit under test, may be achieved by minimizing energy levels rather than by minimizing continuous current magnitudes. In accordance with this concept of the invention, the time during which the current flows is limited rather than the current itself. This permits the actual magnitude of the sensing current in the instrument of the invention to be relatively high, as compared with the continuous current levels used in most prior art instruments. This, in turn, obviates the need for sensitive galvanometers in units constructed in accordance with the invention.

The concepts discussed above of separating the sensing energy from the indicating energy, and by providing for the interrupted introduction of energy to the circuit under test, enables a simple indicator (such as a neon lamp) to be used in the instrument of the invention, and it enables the neon lamp to glow with a relatively high level of brightness to indicate continuity in the circuit under test and without any likelihood of activating that circuit.

A feature of the embodiment of the invention to be described is the provision of an impulse generator which provides a short duration electric pulse when the instrument is operated and for the purposes discussed above, and which also simultaneously furnishes exciting potentials to internal circuitry in the instrument and to the indicator lamp.

The invention meets the requirements of compactness, ruggedness, reliability, long service life and assurance against excessive energization of the circuit under test by employing a manually powered impulse generator and by further employing transistor circuitry. To meet the remaining requirements, the mechanism of the impulse generator is silent and a shielded lamp is employed to provide a silent signal. The lamp is completely enclosed except for a peep hole which may be closed to cut off light leakage during a test simply by pressing the device against the user's face in the region around one eye.

The features and advantages of the invention may be understood from the following detailed description together with the accompanying drawings.

In the drawings, which are to be regarded as merely illustrative:

FIG. 1 is a side elevation of a selected embodiment of the invention;

FIG. 2 is a plan view of the same embodiment;

FIG. 3 is a view largely in longitudinal section and partly in side elevation, the section being taken as indicated by the line 3—3 of FIG. 2, the device being shown in its normal idle state with the operating handle retracted;

FIG. 4 is a view similar to FIG. 3 showing the operating handle depressed for the generation of a test pulse;

FIG. 5 is a diagrammatic view indicating the magnetic circuits involved in the generation of a pulse;

FIG. 6 is an end elevation of the device showing the peep hole for observation of the indicator lamp;

FIG. 7 is an enlarged sectional detail showing the construction of a dashpot that is incorporated in the armature of the pulse generator to silence the snap action of the armature;

FIG. 8 is a wiring diagram showing the circuitry employed in the selected embodiment of the invention;

FIG. 9 is a wiring diagram of further circuitry that may be employed to lower the minimum level of test or sensing current flow at which the signal means is activated.

GENERAL ARRANGEMENT

The principal parts of the device as shown in FIGS. 3 and 4 include: a rectangular metal frame generally designated 10 that incorporates two permanent magnets 12 as end members, and a pair of elongated members 14a and 15a which are disposed adjacent the ends of the magnets 12 and which extend from one of the magnets to the other. The unit further includes two pole pieces 14 and 15 which are formed integral with respective ones of the members 14a and 15a; an armature 16 mounted on a pivot means 18 to cooperate with the two pole pieces 14 and 15 to make and break a magnetic circuit; a winding or coil assembly 20 that surrounds the armature 16 for linkage with the magnetic circuit to create pulses of electric energy; a plunger 22 for forcing the armature 16 out of contact with the two pole pieces 14 and 15 with a snap action to create electric energy in the coil assembly 20; a rubber sealing boot 23 which fits over the plunger 22; an actuating handle or lever 24; a bowed spring strip 25 extending across the under side of the actuating handle and spaced from the handle in engagement with the top of the plunger 22 to serve as a snap-actuating means for the plunger 22 when the actuating handle is depressed; a pair of terminal posts 26 and 28 for connection to opposite sides of a circuit to be tested by a pulse of energy; and a signal lamp 30 for energization to indicate that the circuit under test is operative, the lamp being enclosed and being positioned for observation through a peep hole 31 having a window 32. The peep hole 31 has a flared entrance 33 shaped to serve as an eye piece for the operator.

Suitable provisions may be made to minimize the noise caused by operation of the pulse generator. For this purpose, in the present embodiment of the invention, a rubber bumper 34 is mounted on the underside of the lever 24 and a dashpot, generally indicated D in FIG. 3 and shown in detail in FIG. 7, is incorporated in the armature 16.

The wiring diagram in FIG. 8 shows circuitry that may be incorporated in this embodiment of the invention. The previously mentioned winding or coil assembly 20 of the impulse generator comprises a first winding 35 and a second winding 36. The first winding 35 which generates the high voltage pulse for a signal circuit to energize the lamp 30 may have 4300 turns and may have a tap 38 to divide off a portion 40 of, for example, 100 turns, which portion may be termed an auxiliary coil. The second winding 36 which generates the low energy test or sensing pulse may have 120 turns divided by a center tap 44 into two equal portions of 60 turns each. The low energy sensing pulse produces a maximum current flow in the circuit under test of the order of 20 milliamperes for a duration of the order of 1 millisecond.

The instrument includes an amplifier circuit which, in turn, includes: the winding 36; a wire 45 connecting one end of the winding 36 to the previously mentioned terminal post 26; resistor 46 connecting the second end of the winding 36 to the second terminal post 28; a limiting resistor 48 connecting the second terminal post 28 to the base of a first transistor 50; a common return wire 52 connecting the emitter of the transistor 50 with the center tap 44 of the winding 36, which wire may be grounded (as indicated). The resistance of the circuit under test, to which the amplifier circuit is connected by the terminal posts 26 and 28, is designated (R). It is apparent that when the described amplifier circuit is connected to the circuit to be tested, the resistance (R) of the circuit in combination with the center tapped winding 36 and the resistor 46 completes a bridge network and that the current which flows through the diagonal of the bridge network (and through the base and emitter of the transistor 50) varies as an inverse function of the value of the resistance (R) of the circuit under test, and that such a current flows in a direction to produce a collector current in the transistor only when the value of the resistance (R) is less than the value of the resistor 46.

The transistor 50 is of the NPN type and may be of the kind presently designated 2N679. The transistor 50 functions as an amplifier, as noted, and its output circuit is energized by the auxiliary coil 40 which supplies an exciting potential to that circuit. To form the output circuit, a wire 54 connects the tap 38 with the previously mentioned grounded or return wire 52, and the collector of the transistor 50 is connected to the outer end of the auxiliary coil 40 through a thermistor 55. The collector of the transistor 50 is also connected to the base of a second transistor 56. The thermistor 55 has a negative temperature coefficient, and it serves to compensate for temperature changes over a temperature range of −45° F. to +125° F.

What may be termed a switching circuit and which is controlled by the output of the transistor 50 includes the second transistor 56 which is of the PNP type of switching transistor and which may be of the kind presently designated 2N398. The emitter of the second transistor 56 is connected to the second side of the thermistor 55 and to the outer end of the auxiliary coil 40. The collector of the second transistor 56 is connected to the second end of the coil 35 through the previously mentioned signal lamp 30 with a resistor 58 shunting the lamp. The lamp 30 is a gaseous discharge lamp and may be of the kind presently designated NE2H (General Electric). The lamp may be coated on one side with a radioactive coating designated as No. 865B by the Dial Service Manufacturing, Inc. of Cleveland, Ohio, to eliminate the so-called dark effect. That is, this coating is used to compensate for the effect of darkness of the characteristics of the lamp.

As best shown in FIGURE 5, the permanent magnets 12 and their associated elongated members 14a and 15a form a pair of parallel magnetic circuits through the armature 16, and these circuits are broken when the unit is actuated to snap the armature 16 away from the pole pieces 14 and 15.

OPERATION

When the actuating handle or lever 24 is actuated by the operator to its position shown in FIG. 4, the armature 16 is snapped away from the pole pieces 14 and 15 about the pivot means 18 to break the magnetic circuit. When the handle is released, the magnetic attraction of the pole pieces returns the armature to its original position, as shown in FIG. 3. When the instrument is actuated in the manner described above, a voltage pulse is produced across the winding 36 and across the winding 35 and its portion 40. The voltage pulse across the winding 36 may have such a polarity that the upper terminal of the winding is positive with respect to its tap 44 and the lower terminal is negative. The peak no-load voltages generated, for example, in a constructed embodiment of the invention were of the order of 190 volts across the top portion of the winding 35, 6 volts across the center tapped winding 36, and 5 volts across the auxiliary coil 40.

The voltage pulse induced across the winding 36 appears across the series combination of the resistor 46 and the circuit under test which will be designated as the resistor (R). It is apparent that the resulting potential difference between the terminal 28 at the junction of the resistors 46 and (R), and the center tap 44 of the winding 36 depends upon the relative value of these resistors. When the resistors are equal in value, the potential difference is zero. When the resistor (R) is greater than the resistor 46 the potential difference may be considered a negative voltage, and if the resistor R is less than the resistor 46 the potential difference may be considered a positive voltage.

Only when the potential difference between the terminal 28 and the tap 44 is positive will a current flow in the emitter circuit of the PNP transistor 50. Therefore, for all resistances of the circuit under test which are greater than a threshold established by the value of the resistor 46, the transistor 50 will be non-conductive. This will apply, for example, to an open circuit condition in the circuit under test. However, if there is circuit continuity in the circuit under test, and if the resistance of the circuit is less than the threshold established by the value of the resistor 46, a base-emitter current will flow in the transistor 50. The resistor 46 may have a resistance of 300 ohms, for example, and a sufficient current will flow in the base-emitter circuit of the transistor 50 to cause the indicator lamp 30 to be fired when the circuit under test exhibits a continuous circuit exhibiting a resistance of less than approximately 260 ohms.

The current flow in the series combination of the circuit under test (R) and the resistor 46 due to the voltage pulse induced across the winding 36 constitutes the sensing energy introduced to the circuit under test. The value of the voltage across the winding 36 and the time interval during which it appears is made such that the level of the sensing energy through the circuit under test is sufficiently low so that there will be no danger of that circuit becoming activated. However, as noted above, the current level itself can be relatively high, as compared with the prior art instruments, because it flows for an extremely short interval and is not continuous.

The resulting current flow in the base-emitter circuit of the transistor 50, when the resistance (R) of the circuit under test is below the threshold resistance established by the resistor 46, is amplified by the transistor 50, and an amplified current flows in the collector circuit of that transistor. The limiting resistance 48 is included in the base-emitter circuit of the transistor 50 to limit the current flow through the circuit under test to the permissible maximum under all conditions when the base-emitter path of the transistor 50 becomes conductive. This current may be so limited, for example, to 20 milliamperes.

As noted above, the auxiliary coil 40 produces an in-phase positive going voltage pulse with respect to the pulse across the winding 36 so as to provide exciting potential to the collector of the transistor 50 through the thermistor 55. Then, the presence of a current flow in the base-emitter circuit of the transistor 50 sets up an amplified current flow through the thermistor 55. The thermistor 55, as noted, has a negative temperature coefficient and this thermistor is used to compensate the transistor circuitry for changes in ambient temperatures throughout an ambient temperature range of, for example, −40° F. to +125° F. The thermistor provides for the ignition of the lamp 30 only when the resistance (R) of the circuit under test drops below the established threshold, regardless of ambient temperature conditions throughout the range set out above.

The signal appearing across the thermistor 55 is again amplified by the switching transistor 56. The collector exciting potential for the latter transistor is supplied by the top portion of the winding 35; and the neon lamp 30, with its shunting resistor 58, are included in the collector circuit. The top portion of the winding 35 also produces a voltage pulse which is in time coincidence with the pulse produced across the winding 36 and the auxiliary coil 40. The voltage pulse produced across the top portion of the winding 35 is such that the upper terminal of that portion is negative with respect to the grounded tap 38.

When the switching transistor 56 is rendered conductive by the signal appearing across the thermistor 55 in its base-emitter circuit, the resulting amplified indicator current in its collector circuit flows through the resistor 58 to provide a striking potential for the lamp 30 and causes the lamp to ignite. This occurs when the resistance (R) of the circuit under test is below the threshold established which may, for example, be of the order of 260 ohms. When this occurs, there is sufficient amplified current flowing through the thermistor 55 to cause the transistor 56 to produce sufficient current in the resistor 58 so that the voltage across the latter resistor is high enough to fire the neon indicating lamp 30.

One purpose of the resistor 58 is to cause most of the voltage across the winding 35 to appear across the transistor 56 under conditions when the lamp 30 is not fired. This is necessary because the neon indicator lamp 30 is virtually an open circuit until its gas is ionized. Without the resistor 58 the major part of the voltage induced across the winding 35 is applied across the lamp 30 causing an intermittent flicker of the lamp during periods when it should be extinguished.

CIRCUITRY OF FIG. 9

The circuit shown in FIG. 9 is largely similar to the circuit shown in FIG. 8, as indicated by the use of the numerals to designate corresponding parts, although the latter circuit may involve physically different componets. In the latter instance, the second winding 36a has, for example, only 8 turns and is divided by a center tap 44a into two equal portions of 4 turns each. The limiting resistor 48 is omitted in the circuit of FIG. 9 and, instead, the terminal post 28 is connected by a wire 60 to one side of the primary winding of a transformer 62. The other side of the primary winding of the transformer 62 is connected to one end of the secondary coil of the transformer by a wire 64 and the same end of the secondary coil is connected to the emitter of the first transistor 50, the tap 38 of the winding 35 and the tap 44a of the winding 36a. The second end of the secondary winding of the transformer 62 is connected to the base of the transistor 50.

The collector of the first transistor 50 is connected to one side of the thermistor 55 and is connected to the base of the second transistor 56. The emitter of the second transistor 56 is connected to the second side of the thermistor 55 and is connected to the outer end of the auxiliary coil 40. The collector of the second transistor 56 is connected to the second end of winding 35 in the previously described manner through a gaseous discharge lamp 30 and a shunt resistor 58. The value of the resistor 46a may be 20 ohms and the value of the resistor 58 may be 10 kilo-ohms as heretofore stated.

The transformer 62 serves to match the low impedance of the bridge circuit formed by the winding 36a and resistor 46a and the resistance (R) of the circuit under test to the relatively high impedance of the input to the transistor 50. The peak no-load output voltage of the second winding 36a is approximately 0.45 volt. This second circuit arrangement functions in substantially the same manner as heretofore described but in this instance the signal lamp flashes only when the resistance of the circuit under test is below a maximum of approximately 20 ohms.

STRUCTURAL DETAILS

The present embodiment of the invention as shown, for example, in FIGS. 1–4, has an elongated body 70 of suitable plastic material on which the two terminal posts 26 and 28 are mounted. Each of the two terminal posts is of a well-known construction in which a spring-loaded sleeve 72 has a transverse slot 74. Manual retraction of the sleeve 72 opens the slot 74 to receive a wire of a circuit to be tested and release of the sleeve permits the wire to be firmly gripped in the slot under spring pressure as shown in FIG. 2. The body 70 may be provided with a spring clip 75 to permit the device to be releasably mounted on a user's belt in a well known manner. The lever or actuating handle 24 is mounted by a pivot means 76 on a suitable bracket 78, which bracket is mounted on the body 70 by suitable fastening means, such as screws 80.

The interior of the plastic body 70 is hollow to provide a chamber 82 which serves as a housing for the pulse generator utilized in the instrument. A second chamber is formed in the plastic body adjacent one end of the chamber 82 to accommodate the previously mentioned indicating lamp 30. This indicating lamp may be viewed through the previously mentioned peep hole 31 which is formed in the end of the body 70.

A set screw 84 extends through the casing of the pulse generator and bears against the coil assembly 20. The set screw serves as an adjustment for the pivot means 18. The position of the pivot means 18 is critical to some extent. If the pivot means is positioned too high in FIGURE 3, the armature 16 will not rest properly across the faces of the pole pieces. Conversely, if the pivot means is too low in FIGURE 3 the armature will break with one of the pole pieces before the other.

The hollow interior of the body 70 also forms a circuitry compartment 85 adjacent the other end of the chamber 82. The compartment 85 houses circuit components including the transistors 50 and 56 described above, and the various associated resistors. The components and associated circuitry are mounted on a panel 86 in the compartment 85, and the circuitry in the compartment is potted with a suitable sealing compound. This compound not only hermetically seals the circuit components but also provides protection against damage of the components by shock.

The dashpot D is formed by providing a bore 88 in the underside of the armature 16 of the pulse generator and a second bore 92 in the upper side of the armature (see especially FIG. 7). The bore 88 serves as a cylinder for a piston 90, and the bore 92 serves as a cylinder for a second piston 94. The two pistons are integral with one another, and they are in the form of solid cylindrical bodies with peripheral grooves 95 formed in them, the grooves being used to seat suitable O-rings 96. The two bores 88 and 92 are in axial alignment and are interconnected by a restricted bore 98. The two pistons 90 and 94 are rigidly interconnected by an axial stem 100 that extends through the restricted bore 98 and the space between the two pistons is filled with a liquid body 102 which may be a suitable oil.

In the normal position of the dashpot D shown in FIGS. 3 and 7, the two interconnected pistons 90 and 94 are in their upper positions with the upper piston 94 protruding above the upper surface of the armature 16. When the pulse generator is operated by depression of the lever 24 in the manner indicated in FIGS. 3 and 4, the armature 16 swings away from the two pole pieces 14 and 15 with an exceedingly rapid snap action which carries the protruding upper piston 94 against a rubber stop pad 104 which is cemented into place. Before the swinging armature can make contact with the stop pad 104, the protruding piston 94 impinges on the stop pad and is retracted to force the dashpot liquid through the restricted bore 98 from the upper bore 92 into the lower bore 88. The resistance to the flow of the dashpot liquid through the restricted bore absorbs energy for rapid but smooth deceleration of the armature. The same action occurs on the return stroke of the armature, and the piston 90 prevents the armature from striking against the pole pieces in a violent manner with the resulting creation of audible "clicks." A notable feature of the shock absorber formed by the dashpot assembly described above is that it acts after the electrical output has been produced by the instrument. The shock absorber, therefore, does not effect the electrical characteristics of the instrument. However, the shock absorber fully performs its mechanical function of rendering the instrument noiseless for all practical purposes.

Our description in specific detail of the selected practices of the invention will suggest various changes, substitutions and other departures from our disclosure within the spirit and scope of the appended claims.

We claim:

1. In combination, a testing instrument for ascertaining whether the resistance of a circuit under test is below an established threshold, a circuit under test having a particular function and requiring electrical energy above a particular minimum level to perform that function, the instrument including generating means including a first winding coupled to the circuit under test for introducing a pulse of sensing electrical current to the circuit under test, said pulse having a relatively low energy content below the minimum level required by the circuit under test to perform its function, first circuit means including resistance means connected to form a bridge network with the circuit under test and said first winding, a first transistor coupled to said bridge network and effective when the sensing current pulse introduced to the circuit under test by said first winding for producing an indicating current pulse when the resistance of the circuit under test is below a threshold established by the resistance means, said indicating current pulse having a relatively high energy as compared with the energy content of the sensing current pulse, indicating means, and second circuit means including a second transistor coupled to said first transistor and to said indicating means and responsive to the indicating current pulse from the first transistor for activating the indicating means said generating means including a second winding for supplying a relatively low exciting potential to the first transistor, and a third winding for supplying a relatively high exciting potential across the indicating means and the second transistor, said generating means further including a magnetic circuit linked with said first and second and third windings and including at least one pole piece, and a snap-acting armature assembly positioned alternately to engage the pole pieces so as to make and break the magnetic circuit.

2. The combination defined in claim 1 and which includes a manually actuated handle, and means for coupling the handle mechanically to the snap-acting armature assembly.

3. The combination defined in claim 1 and which includes shock absorber means for preventing the armature from violently striking against the pole piece upon its return to an abutting position therewith.

4. The combination defined in claim 1 and which includes shock absorber means for preventing the armature from violently striking against the pole piece upon its return to an abutting position therewith, the shock absorber means including a piston supported in a bore in the armature for reciprocal movement in the bore, and fluid means in the bore for retarding the movement of the piston.

5. In combination for testing whether an impedance under test has a particular value, actuating means for producing a single pulse of energy upon actuation, switching means, means connected in an electrical circuit with the impedance and responsive to a portion of the energy in the pulse from the actuating means for operating the switching means upon the occurrence of the particular value for the impedance, and indicating means connected in an electrical circuit with the switching means and responsive to the remaining portion of the energy in the pulse from the actuating means for providing an output indication upon the operation of the switching means.

6. In combination for testing whether an impedance under test has a particular value, means actuatable to generate a single pulse of energy, switching means, bridge circuitry including the actuatable means and the impedance and coupled electrically to the switching means and responsive to a minor portion of the energy in the pulse from the actuatable means for operating the switching means upon the occurrence of the particular value for the impedance, and electrical circuitry including an indicator and the switching means and responsive to a major portion of the energy in the pulse from the actuatable means for obtaining an indication by the indicator upon the operation of the switching means.

7. The combination set forth in claim 6, including, means coupled electrically to the switching means and responsive to a minor portion of the energy in the pulse from the actuatable means for biasing the switching means to facilitate the operation of the switching means.

8. In combination for testing the impedance of a test circuit having the function of generating a particular amount of heat and requiring electrical energy above a particular minimum level to perform that function, means actuatable to generate a single pulse of energy, switching means, means including the test circuit and coupled electrically to the switching means and responsive to a portion of the energy in the pulse below the particular minimum level for operating the switching means upon the occurrence of a particular impedance for the test circuit, and means including the switching means and responsive to a major portion of the energy in the pulse for providing an output indication upon the operation of the switching means.

9. The combination set forth in claim 8, including, means coupled electrically to the switching means and responsive to changes in ambient temperature for providing a compensation to obtain the operation of the switching means upon the occurrence of the particular impedance for the test circuit regardless of changes in the ambient temperature.

10. In combination for testing whether an impedance under test has a particular value, means actuatable to generate a single pulse of electromagnetic energy, a first winding included in the actuatable means and having a first number of turns for generating a relatively low voltage pulse in accordance with the generation of the single pulse of electromagnetic energy, a second winding included in the actuatable means and having a second number of turns for generating a relatively high voltage pulse in accordance with the generation of the single pulse of electromagnetic energy, switching means having a normally open state and having a closed state, first electrical circuitry connected to the switching means and including the first winding and the impedance for closing the first switching means upon the occurrence of the particular value for the impedance, an indicator, and second electrical circuitry including the indicator, the second winding and the switching means for obtaining an output indication by the indicator upon the closure of the switching means and in accordance with the voltage pulse from the second winding.

11. The combination set forth in claim 10, including, a third winding included in the actuatable means and having a third number of turns for generating a relatively low voltage in accordance with the generation of the single pulse of electromagnetic energy, the switching means constituting a semi-conductor and the first winding being coupled electrically to the semi-conductor to bias the semi-conductor toward a state of conductivity upon the generation of the relatively low voltage in the third winding.

12. The combination set forth in claim 11, including, means coupled electrically to the semi-conductor and responsive to changes in ambient temperature for varying the bias on the semi-conductor to compensate for such temperature changes.

13. In combination, a circuit under test having a particular function and requiring electrical energy above a particular minimum level to perform that function, means coupled to the circuit under test and actuatable to generate only a single pulse of electrical energy wherein the energy of such pulse is below the particular minimum level, said generating means including winding means across which the single pulse is generated upon each actuation of the generating means, circuit means including resistance means and connecting said circuit under test and said winding means to form a bridge network for measuring the resistance of the circuit under test, transistor means coupled to said circuit under test and to said resistance means in the bridge network for producing an indicating signal having a relatively high energy level upon the occurrence of a resistance value for the circuit under test different by a particular amount from the resistance of said resistance means, and an indicator coupled to said transistor means and said winding means and responsive to the relatively high level in the indicating signal for providing an output indication.

14. In combination for use with a circuit under test having the particular function of generating a predetermined amount of heat and requiring electrical energy above a particular minimum level to perform that function, means for testing the continuity of the circuit under test without introducing thereto electrical energy above the particular minimum level, said testing means including: a manually operated magnetic generator coupled to the circuit under test for generating only a single sharp pulse having an energy level below the particular minimum level upon each manual operation of the magnetic generator, means coupled to the magnetic generator and the circuit under test for introducing the single pulse to the circuit under test, and circuit means coupled to the circuit under test and responsive to the single pulse from the magnetic generator for providing an output indication upon the occurrence of a particular value for the resistance of the circuit under test.

15. The combination set forth in claim 14 wherein said circuit means includes amplifier means coupled to the circuit under test and to the generator to remain normally nonconductive, and wherein said generator includes means coupled to the amplifier means for introducing pulses of biasing potentials to said amplifier means upon the introduction of the single pulse to the circuit under test to obtain a conductivity of the amplifier when the circuit under test has the particular resistance, and wherein the circuit means includes an indicator connected to the amplifier means for providing an output indication upon the conductivity of the amplifier means.

References Cited in the file of this patent
UNITED STATES PATENTS

| | | |
|---|---|---|
| 2,531,145 | Marco et al. | Nov. 21, 1950 |
| 2,536,022 | Beach et al. | Jan. 2, 1951 |
| 2,633,019 | Albrecht et al. | Mar. 31, 1953 |
| 2,976,485 | Bartz | Mar. 21, 1961 |